United States Patent
Pelouch et al.

(10) Patent No.: US 9,461,437 B2
(45) Date of Patent: Oct. 4, 2016

(54) TILT CONTROL THROUGH OPTICAL PUMP POWER ADJUSTMENT

(71) Applicant: Xtera Communications, Inc., Allen, TX (US)

(72) Inventors: Wayne S. Pelouch, McKinney, TX (US); Do-Il Chang, Allen, TX (US); Stephen Michael Webb, Gravesend (GB)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 14/200,863

(22) Filed: Mar. 7, 2014

(65) Prior Publication Data

US 2014/0268308 A1    Sep. 18, 2014

Related U.S. Application Data

(60) Provisional application No. 61/780,549, filed on Mar. 13, 2013.

(51) Int. Cl.
| | |
|---|---|
| *H01S 3/067* | (2006.01) |
| *H01S 3/30* | (2006.01) |
| *H04B 10/29* | (2013.01) |

(Continued)

(52) U.S. Cl.
CPC ............. *H01S 3/302* (2013.01); *H01S 3/022* (2013.01); *H01S 3/1312* (2013.01); *H01S 3/2375* (2013.01); *H04B 10/2916* (2013.01); *H04B 10/2942* (2013.01); *H01S 3/06758* (2013.01); *H01S 3/094061* (2013.01); *H01S 3/1608* (2013.01); *H01S 2301/04* (2013.01)

(58) Field of Classification Search
CPC .......... H04B 10/2918; H04B 10/2942; H01S 3/06758; H01S 3/302
See application file for complete search history.

(56) References Cited

U.S. PATENT DOCUMENTS 6,429,966 B1 *  8/2002  Hazell et al. ............ 359/341.41
6,441,950 B1 *  8/2002  Chen ................... H04B 10/0777
                                                        359/334

(Continued)

FOREIGN PATENT DOCUMENTS

| | | |
|---|---|---|
| EP | 1115184 | 7/2001 |
| WO | WO 02/30018 | 4/2002 |

OTHER PUBLICATIONS

Bolshtyansky et al. "Dynamic Compensation of Raman Tilt in a Fiber Link by EDFA during Transient Events", Optical Fiber Communication and the National Fiber Optic Engineers Conference, 2007, (Mar. 25-29, 2007).*

(Continued)

*Primary Examiner* — Eric Bolda

(57) ABSTRACT

The adjustment of tilt in an optical signal path of a repeater. The repeater includes an optical pump that optically powers a rare-Earth doped fiber amplifier, which amplifies the optical signal. The optical signal path also includes Raman gain stage implemented in a previous optical fiber span in the optical signal path, and which contributes tilt with respect to wavelength. Adjusting the Raman gain and/or the rare-Earth doped gain also adjusts the combined tilt contributed by these gain stages. However, the rare-Earth doped gain operates at least partially in the saturated regime, thereby stabilizing the gain at the output of the rare-Earth doped amplifier. Thus tilt control may be employed by adjusting optical pump power with reduced effect on overall gain.

20 Claims, 9 Drawing Sheets

(51) Int. Cl.
*H04B 10/294* (2013.01)
*H04B 10/291* (2013.01)
*H01S 3/131* (2006.01)
*H01S 3/23* (2006.01)
*H01S 3/02* (2006.01)
*H01S 3/094* (2006.01)
*H01S 3/16* (2006.01)

(56) References Cited

U.S. PATENT DOCUMENTS

| | | | |
|---|---|---|---|
| 6,624,926 B1 * | 9/2003 | Hayashi et al. | 359/334 |
| 6,785,042 B1 * | 8/2004 | Onaka | H04B 10/296 359/334 |
| 2001/0050802 A1 * | 12/2001 | Namiki et al. | 359/337.11 |
| 2002/0181859 A1 * | 12/2002 | Clark et al. | 385/27 |
| 2003/0076578 A1 * | 4/2003 | Goto et al. | 359/337.4 |
| 2003/0179440 A1 * | 9/2003 | Foursa et al. | 359/334 |
| 2003/0190166 A1 | 10/2003 | Sekine | |
| 2004/0196532 A1 | 10/2004 | Evangelides, Jr. et al. | |
| 2010/0209110 A1 * | 8/2010 | Pelouch et al. | 398/92 |

OTHER PUBLICATIONS

International Preliminary Report on Patentability issued for PCT/GB2014/050742 dated Sep. 15, 2015, 8 pgs.

* cited by examiner

TILT CONTROL THROUGH OPTICAL PUMP POWER ADJUSTMENT

CROSS-REFERENCE TO RELATED APPLICATIONS

The present application claims priority under 35 U.S.C. 119(e) to U.S. provisional application Ser. No. 61/780,549 filed Mar. 13, 2013, which provisional patent application is incorporated herein by reference in its entirety.

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between a local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optical signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
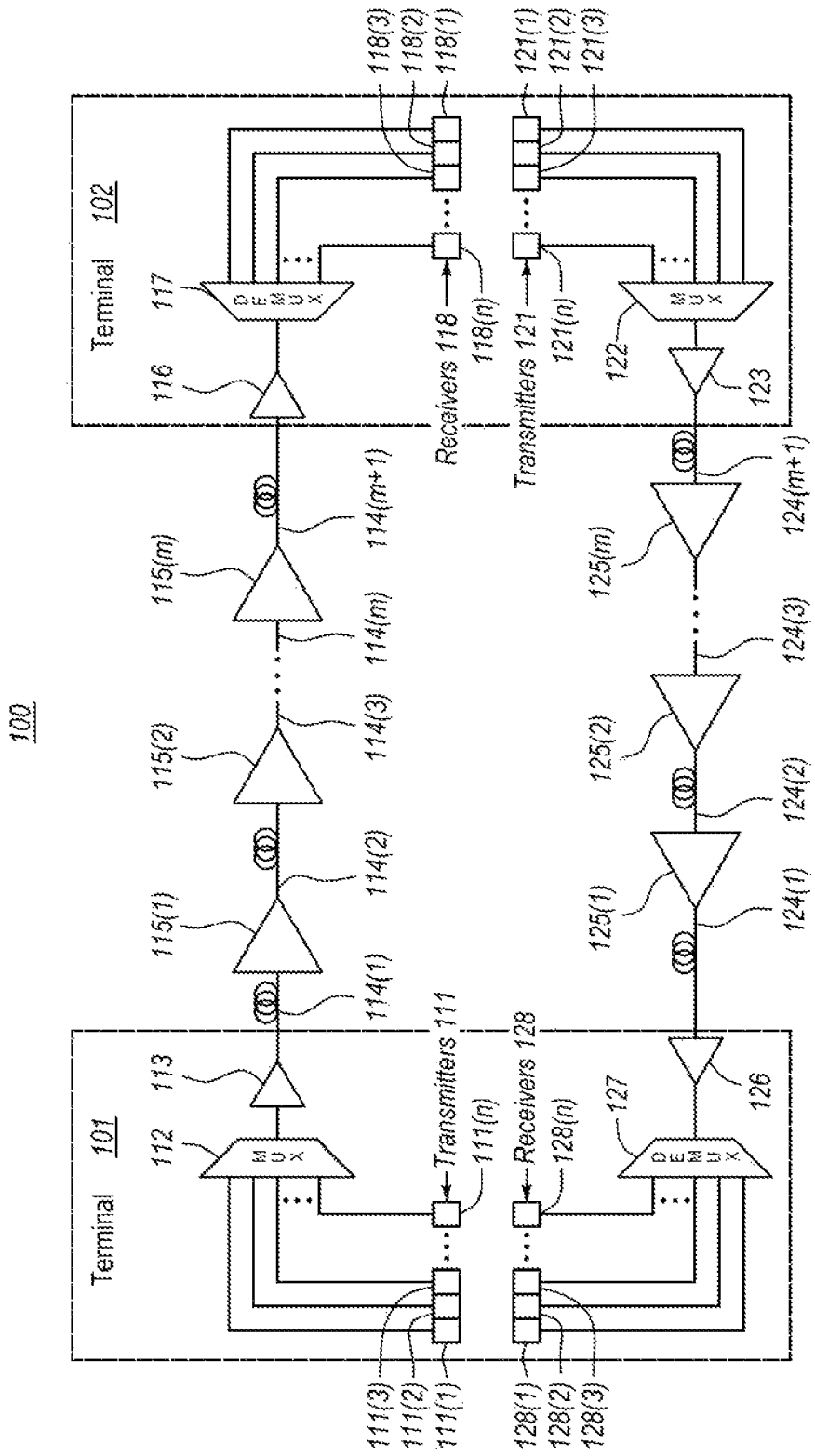
FIG. 1 schematically illustrates an example optical communications system in which the principles described herein may be employed.

At least one embodiment described herein relates to the adjustment of tilt in an optical signal path of a repeater. The repeater includes an optical pump that optically powers a rare-Earth doped fiber amplifier, which amplifies the optical signal in the optical signal path and operates at least partially in the saturated regime. The optical signal path also includes a Raman gain stage which contributes tilt with respect to wavelength. The Raman amplifier may also be referred to herein as a "previous Raman amplifier" as the Raman amplifier is implemented prior to the rare-Earth doped fiber amplifier in the signal path. If counter-propagating Raman gain is employed, the Raman pump may be within the same repeater as the rare-Earth doped fiber amplifier.

Increasing the Raman pump power increases the tilt contributed by the previous Raman amplifier (and also increases the Raman gain), whereas decreasing the Raman pump power decreases the tilt contributed by the previous Raman amplifier (and also decreases the Raman gain). The effect of the changing Raman gain due to adjusting the Raman pump power, however, is reduced at the output of the rare-Earth doped fiber amplifier since the rare-Earth doped fiber amplifier operates at least partially within the gain saturation regime. Accordingly, the primary effect of changing the Raman pump power is to adjust the tilt detected at the output of the rare-Earth doped fiber amplifier.

In some embodiments, the optical signal wavelength range and the previous Raman amplifier are configured in a manner in which the previous Raman amplifier contributes negative tilt to the optical signals with respect to wavelength. In these embodiments, the rare-Earth doped fiber amplifier may contribute positive, negative, or insignificant tilt to the optical signals with respect to wavelength.

In other embodiments, such as those described below, the optical signal wavelength range and the previous Raman amplifier are configured in a manner that the previous Raman amplifier contributes positive tilt to the optical signals with respect to wavelength. In these embodiments, the rare-Earth doped fiber amplifier again may contribute positive, negative (as in the specific embodiments described below), or insignificant tilt to the optical signals with respect to wavelength.

Configuring the Raman pump to have a peak gain near or longer than the long wavelength edge of the signal spectrum results in a Raman gain that is predominantly linear with respect to wavelength. Accordingly, the configuration has the advantage that adjusting the Raman pump power results in primarily a linear gain tilt. In other words, there are no significant peaks or troughs added to the gain spectrum as a result of Raman amplification. For instance, the Raman pump contributes positive tilt and is configured such that at least one wavelength of the Raman pump has a peak Raman gain at a wavelength that is greater than or within 5 nanometers of the longest signal wavelength. In the case where the Raman pump contributes negative tilt, the Raman pump might be configured to have a peak Raman gain at a wavelength that is less than or within 5 nanometers of the shortest signal wavelength.

Configuring the rare-Earth doped fiber amplifier to have opposite tilt to the preceding Raman amplifier is convenient in order to balance the total gain (versus wavelength) of the combination of amplifiers, but is not required to achieve tilt control of the optical signals. An active element, such as an optical amplifier or gain flattening element, or a passive element, such as a gain flattening filter, may be configured to provide nominally flat gain to the optical signals at some point or multiple points in the optical signal path. In the specific embodiments described hereinbelow, the rare-Earth doped fiber amplifier contributes positive tilt, and the preceding Raman amplifier contributes negative tilt. However, as just mentioned, the embodiments described herein are not limited to this configuration.

In order to reduce the effect of changed Raman gain on the output power of the rare-Earth doped fiber amplifier, the doped optical fiber amplifier operates at least partially in the gain saturation regime as measured by output signal power over corrected pump power. In this description, and in the claims, "at least partially in the gain saturation regime as measured by output signal power over corrected pump power" means that the output optical signal power from the rare-Earth doped fiber amplifier is at least ten percent of the corrected optical pump power received at the rare-Earth doped fiber amplifier from the doped fiber amplifier optical pump. In the description and in the claims, the "corrected optical pump power" means the amount of pump power provided to the doped fiber amplifier is corrected for the differences in wavelength which is typically called "quantum conversion efficiency". For instance, for a pump wavelength of 980 nm and a signal wavelength of 1550 nm, only $980/1550$ or about 63% of the pump power can be converted to signal power. In other words, no more than 100% of the pump photons (at a larger photon energy) can be converted to signal photons (at a smaller photon energy). Thus, in determining the corrected optical pump power, the actual optical pump power received at the doped fiber amplifier would be discounted by some 37% to account for the quantum conversion efficiency of 63% (i.e., $980/1550$). In alternative embodiments, the output optical signal power provided by the doped fiber amplifier may be at least 15%, 20%, 25%, 30%, 40%, 50%, 60%, 75% and 100% of the corrected optical pump power and thereby be operating in the saturation regime as measured by the output optical signal power over corrected pump power.

Alternatively or in addition, the rare-Earth doped fiber amplifier is operating at least partially in the gain saturation regime as measured by linear gain reduction over small-signal gain value. In this description and in the claims, "at least partially in the gain saturation regime as measured by linear gain reduction over small-signal gain value" means that the linear gain of the amplifier is reduced by at least 25% compared to the small-signal gain value. In this description and in the claims, the "small-signal gain value" is the maximum amount of gain possible at a particular optical pump power. For example, if the small-signal gain of the rare-Earth doped fiber amplifier is 100 (20 dB), then as the input signal power is increased and the gain of the amplifier is reduced to 75 or less, it will be considered to be operating in the saturation regime. The more saturated the rare-Earth doped fiber amplifier is, the more constant its output signal power. In alternative embodiments, the ratio of the linear gain reduction over small-signal gain may be 30%, 40%, 50%, 60%, 75% and 90%, while operating in the gain saturation regime. In this description and in the claims, a doped fiber amplifier is operating "at least partially in the gain saturation regime" if the doped fiber amplifier is operating at least partially in the gain saturation regime as measured by output signal power over corrected pump power and/or the doped fiber amplifier is operating at least partially in the gain saturation regime as measured by linear gain reduction over small-signal gain value.

Tilt might also be controlled by adjusting the optical pump power supplied to the rare-Earth doped fiber amplifier. However, in some embodiments, this optical pump power may remain constant, allowing that optical pump power to be shared (such as with rare-Earth doped fiber amplifier) in the opposite signal path. Adjusting the optical pump power supplied to the rare-Earth doped fiber amplifier typically changes the output power of the optical signal which may lead to a degradation of the signal transmission quality.

The signal power at the input to each fiber span of an optical transmission link is an important parameter relating to the signal transmission quality. If the signal power is too high, nonlinear transmission penalties will result which reduces the signal quality. If the signal power is too low, the optical signal-to-noise ratio (OSNR) will be reduced which reduces the signal quality. Signal gain tilt raises the signal power of some wavelengths and reduces the signal power of other wavelengths leading to a non-optimal condition. Signal gain tilt at one repeater will typically propagate down the link until it is corrected so that the effect of the tilt may be realized at a number of spans in the optical transmission link. Thus, controlling gain tilt without changing the average signal power in an optical transmission link is important to the overall signal quality.

First, a repeatered optical environment will first be described with respect to FIG. 1. Then, embodiments of the tilt control will be described with respect to subsequent figures.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". The terms "eastern" and "western" are simply terms of art used to allow for easy distinction between the two optical signals travelling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "optical wavelength channels". Each optical wavelength channel is allocated a particular frequency for optical communication. Signals that fall within the particular frequency will be referred to as respective optical wavelength signals. Accordingly, in order to communicate using WDM or DWDM optical signals, the terminal 101 may have "n" optical transmitters 111 (including optical transmitters 111(1) through 111(n), where n is a positive integer), each optical transmitter for transmitting over a corresponding eastern optical wavelength channel. Likewise, the terminal 102 may have "n" optical transmitters 121 including optical transmitters 121(1) through 121(n), each also for transmitting over a corresponding western optical wavelength channel. The principles described herein are not limited, however, to communications in which the number of eastern optical wavelength channels is the same as the number of western optical wavelength channels. Furthermore, the principles described herein are not limited to the precise structure of the each of the optical transmitters. However, lasers are an appropriate optical transmitter for transmitting at a particular frequency. The optical transmitters may be tunable within a frequency range.

As for the eastern channel for optical transmission in the eastern direction, the terminal 101 multiplexes each of the eastern optical wavelength signals from the optical transmitters 111 into a single eastern optical signal using optical multiplexer 112, which may then be optically amplified by an optional eastern optical amplifier 113 prior to being transmitted onto a first optical fiber span 114(1).

There are a total of "m" repeaters (labeled 115 for the eastern repeaters and 125 for the western repeaters) and "m+1" optical fiber spans (labeled 114 for the eastern fiber links and 124 for the western fiber links) between the terminals 101 and 102 in each of the eastern and western channels. However, there is no requirement for the number of repeaters in each of the eastern and western channels to be equal. Each of the repeaters may consume electrical power to thereby amplify the optical signals.

The eastern optical signal from the final optical fiber span 114(m+1) is then optionally amplified at the terminal 102 by an optional optical amplifier 116. The eastern optical signal is then demultiplexed into the various wavelength optical wavelength channels using optical demultiplexer 117. The various optical wavelength channels may then be received and processed by corresponding optical receivers 118 including optical receivers 118(1) through 118(n).

As for the western channel for optical transmission in the western direction, the terminal 102 multiplexes each of the western optical wavelength signals from the optical transmitters 121 (including optical transmitters 121(1) through 121(n)) into a single western optical signal using the optical multiplexer 122. The multiplexed optical signal may then be optically amplified by an optional western optical amplifier 123 prior to being transmitted onto a first optical fiber span 124(m+1). If the western optical channel is symmetric with the eastern optical channel, there are once again "m" repeaters 125 (labeled 125(1) through 125(m)), and "m+1" optical fiber spans 124 (labeled 124(1) through 124(m+1)).

The western optical signal from the final optical fiber span 124(1) is then optionally amplified at the terminal 101 by the optional optical amplifier 126. The western optical signal is then demultiplexed using optical demultiplexer 127, whereupon the individual wavelength division optical channels are received and processed by the optical receivers 128 (including optical receivers 128(1) through 128(n)). Terminals 101 and/or 102 do not require all the elements shown in optical communications system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeatered system) for high-quality single mode fiber might be about 50 kilometers, and in practice may range from 30 kilometers or less to 100 kilometers or more. That said, the principles described herein are not limited to any particular optical path distances between repeaters, nor are they limited to repeater systems in which the optical path distances are the same from one repeatered segment to the next.

The optical communications system 100 is represented in simplified form for purpose of illustration and example only. The principles described herein may extend to much more complex optical communications systems. The principles described herein may apply to optical communication systems in which there are multiple fiber pairs, each for communicating multiplexed WDM optical signals. Furthermore, the principles described herein also apply to optical communications in which there are one or more branching nodes that split one or more fiber pairs and/or optical wavelength channels in one direction, and one or more fiber pairs and/or optical wavelength channels in another direction.

Figure 2:
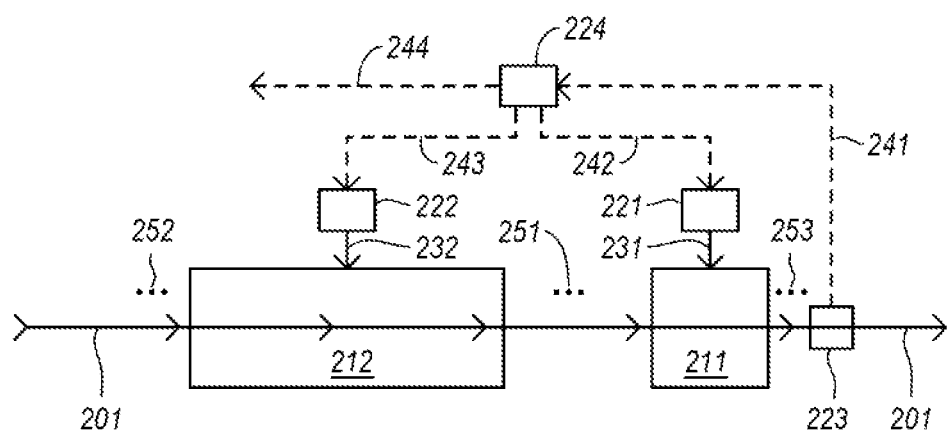
FIG. 2 illustrates a system that includes a Raman gain stage and a rare-Earth doped fiber amplifier that operates on an optical signal travelling along an optical signal path.

FIG. 2 illustrates a system 200 that operates on an optical signal 201 travelling along an optical signal path (from left to right in FIG. 2). For instance, in the context of FIG. 1, the optical signal 201 could be an eastern optical signal traveling from terminal 101 to terminal 102, or a western optical signal traveling from terminal 102 to terminal 101.

The system 200 includes a rare-Earth doped fiber amplifier 211 and a Raman gain stage 212, both within the optical signal path of the optical signal 201. The rare-Earth doped fiber amplifier 211 is powered by optical pump power 231 provided by an optical pump 221 (also referred to herein as a "doped fiber amplifier pump"). An example of the rare-Earth doped fiber amplifier 211 is an erbium doped fiber amplifier. The Raman gain stage 212 is powered by optical pump power 232 provided by an optical pump 222 (also referred to herein as a "Raman pump").

As will be described further below, in one embodiment, the rare-Earth doped fiber amplifier 211 amplifies the optical signal 201 in a manner that contributes overall negative tilt with respect to wavelength (hereinafter referred to simply as "negative tilt") to the optical signal 201. Also, the Raman gain stage 212 performs Raman amplification of the optical signal 201 in a manner that contributes overall positive tilt with respect to wavelength (hereinafter referred to simply as "positive tilt") to the optical signal 201. In this description and in the claims, a gain stage contributes "negative tilt with respect to wavelength" or simply "negative tilt" if the gain stage amplifies lower wavelength signals with higher gain than higher wavelength signals within the signal frequency spectrum. A gain stage contributes "positive tilt with respect to wavelength" or simply "positive tilt" if the gain stage amplifies lower wavelength signals with lower gain than higher wavelength signals within the signal frequency spectrum. Typically, the average tilt (positive tilt in this example) provided by Raman amplification is at least 1 dB.

A tilt sensor 223 is configured to detect tilt of the optical signal 201 downstream of the rare-Earth doped fiber amplifier 211 in the optical signal path. This measured tilt is provided as input (as represented by arrow 241) to a tilt adjustment mechanism 224, which is configured to adjust tilt by controlling (as represented by arrow 242) the optical pump power 231 supplied by the doped fiber amplifier pump 221 and/or by controlling (as represented by arrow 243) the optical pump power 232 supplied by the Raman pump 222. The arrow 244, the ellipses 251, the ellipses 252, and the ellipses 253 will be explained further below. In some embodiments, the tilt adjustment mechanism is configured to adjust the pump power 231 and/or 232 so that the tilt is within 1 dB of gain (measured by the maximum signal gain experienced by any of the optical channels minus the minimum signal gain experienced by any of the optical channels) or within 1 dB of power (measured by the maximum signal power of any of the optical channels minus the minimum signal power of any of the optical channels).

The adjustment mechanism 224 is configured to permit adjusting of tilt (as measured by the tilt sensor 223) to within 1 dB peak to peak. Furthermore, this may be performed while keeping the gain of the optical signal across the combination of the previous optical fiber span in the optical signal path and the optical signal path in the repeater within 1 dB of zero. The underlying physics behind how this is may be achieved will be described with respect to FIGS. 3 through 5.

Figure 3:
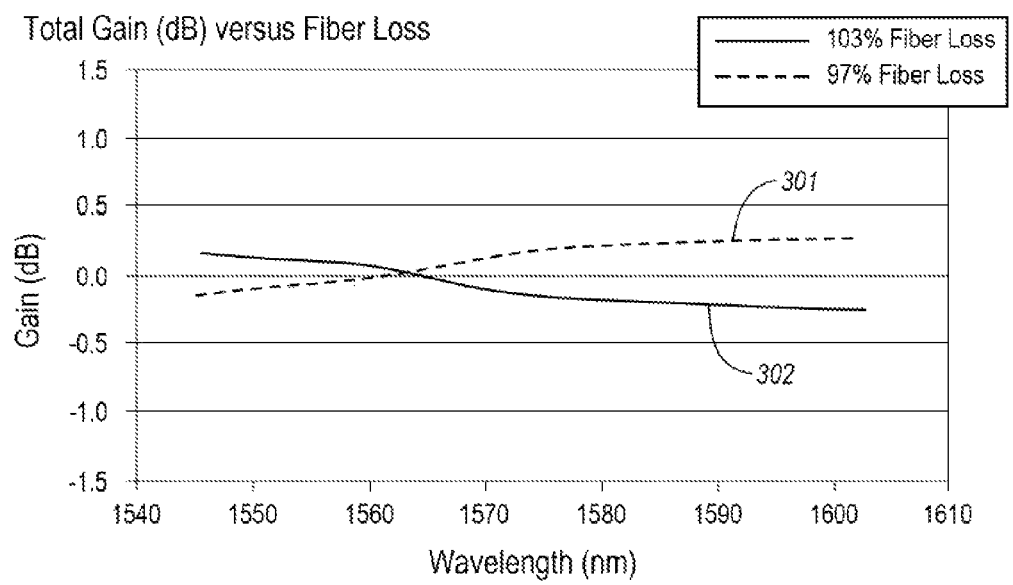
FIG. 3 illustrates a graph showing the effects of changes in fiber span loss versus total gain of a Raman gain stage and a rare-Earth doped fiber amplifier.

FIG. 3 illustrates a graph 300 showing an example of the total repeater gain versus a change in line fiber or span loss. In this example, the gain is approximately 0 dB for all signal wavelengths (not shown in the graph) for a particular value of fiber loss. The fiber loss may vary from this particular value due to variations during manufacture or possibly due to aging or repair of the fiber span over time. Plot 301 shows the total repeater gain when the fiber loss is decreased to 97% of the nominal value resulting in positive tilt. Plot 302 shows the total repeater gain when the fiber loss is increased to 103% of the nominal value resulting in negative tilt.

Figure 4A:
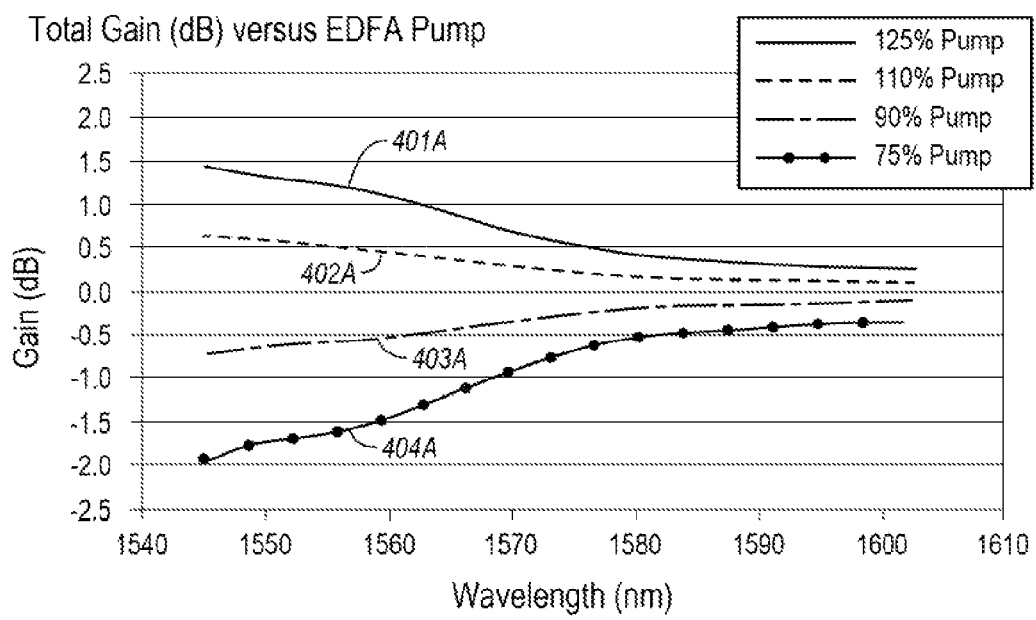
FIG. 4A illustrates a graph showing the effects of changes in Erbium-doped fiber amplifier (EDFA) pump power versus total gain of an optical repeater and fiber span.
Figure 4B:
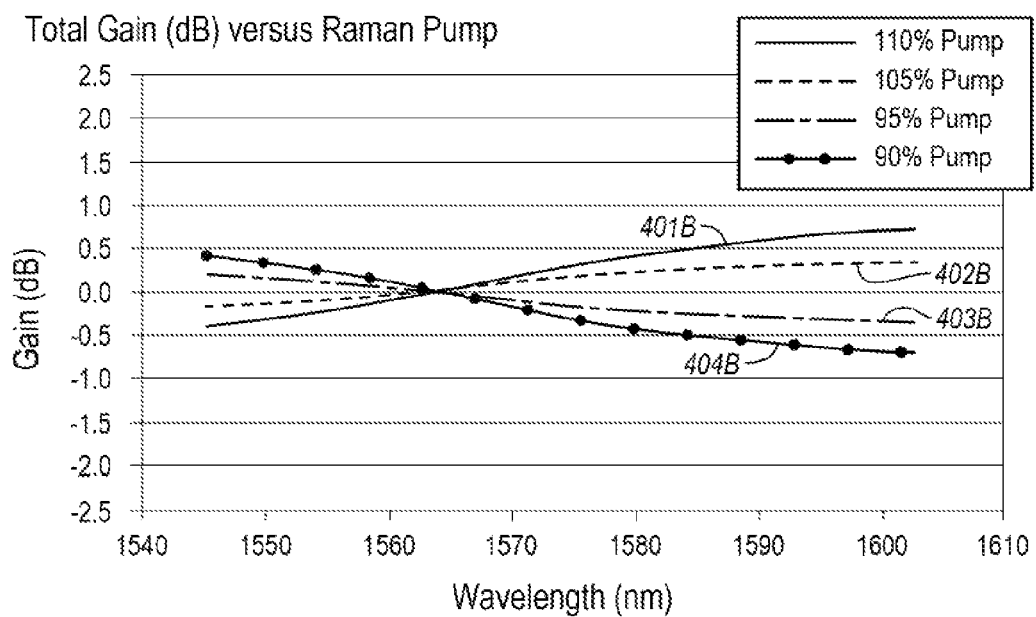
FIG. 4B illustrates a graph showing the effects of changes in Raman pump power versus total gain of an optical repeater and fiber span.

FIGS. 4A and 4B respectively illustrate graphs 400A and 400B, which show a relationship between pump power and total repeater gain across a wide range of signal wavelengths. FIG. 4A illustrates an example of the total repeater gain for different values of erbium doped fiber pump power. Although this example depicts gain curves for an erbium doped fiber amplifier, similar curves would be obtained for other rare-Earth doped fiber amplifiers. In this example, the gain is approximately 0 dB for all signal wavelengths (not shown in the graph) for a particular value of erbium doped fiber pump power. Plots 401A, 402A, 403A, and 404A show the total repeater gain as the erbium doped fiber pump power is changed to 125%, 110%, 90%, and 75% of the original value, respectively. None of the gain curves 401A, 402A, 403A, and 404A cross 0 dB demonstrating both a change in tilt and a significant change in average gain.

As previously mentioned, erbium doped fiber amplifiers are examples of rare-Earth doped fiber amplifiers, and thus the graph shows example physical characteristics of the rare-Earth doped fiber amplifier 211 of FIG. 2.

FIG. 4B illustrates an example of the total repeater gain for different values of Raman pump power. In this example, the gain is approximately 0 dB for all signal wavelengths (not shown in the graph) for a particular value of Raman pump power. Plots 401B, 402B, 403B, and 404B show the total repeater gain as the Raman pump power is changed to 110%, 105%, 95%, and 90% of the original value, respectively. All of the gain curves 401B, 402B, 403B, and 404B cross 0 dB demonstrating primarily a change in tilt and an even less significant change in average gain compared to plots 400A. In Raman amplification, with a pump that provides peak gain near the long wavelength side of the signal spectrum, tilt has a positive correlation with optical pump power. Thus, the greater the Raman pump power, the greater the positive tilt (and the lesser the Raman pump power, the greater the negative tilt).

Plots 300 and 400B both result in changes to the input signals of the rare-Earth doped fiber amplifier gain stage. The saturating effects in the rare-Earth doped fiber amplifier result in a total repeater output power that does not scale linearly with input power. In fact, the output power after the rare-Earth doped fiber amplifier stays relatively constant as the input signal power is changed. Thus, the further in the saturation region the erbium doped fiber amplifier operates, the more the output signal power is insulated from variations in the input optical signal power.

Figure 5:
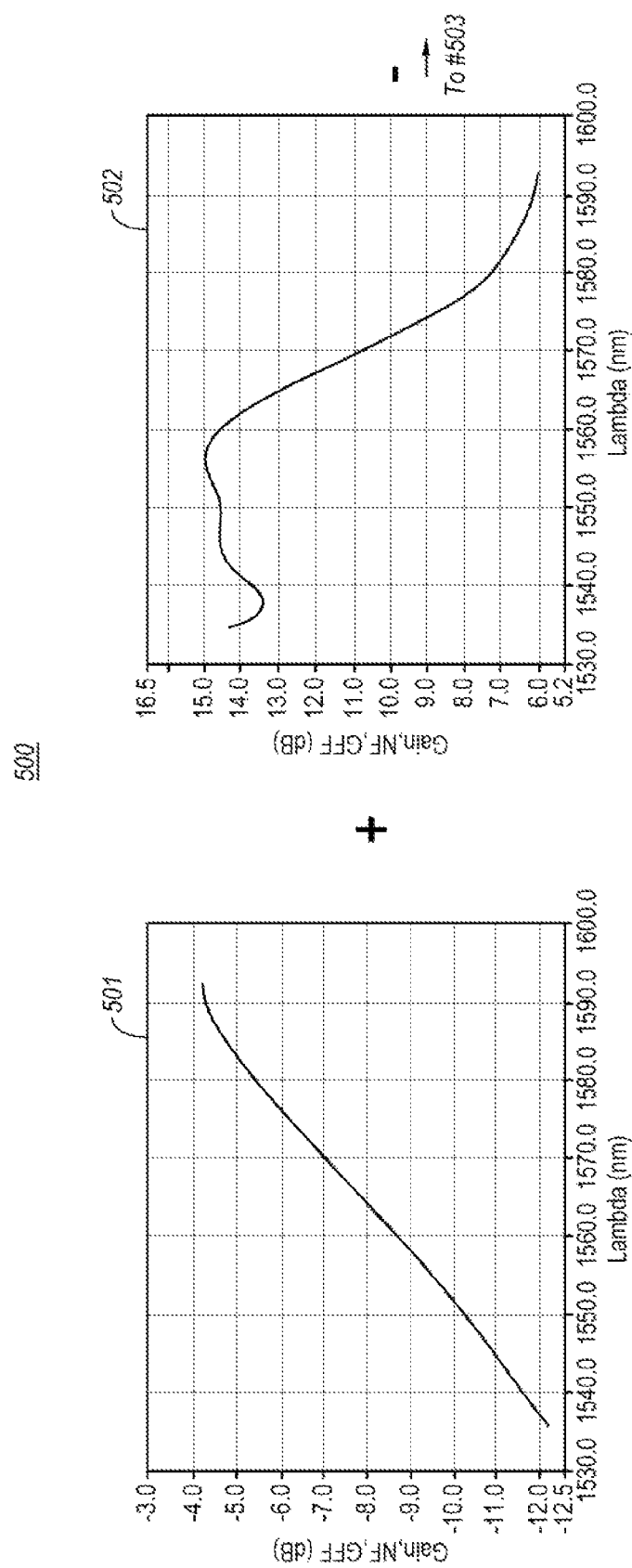
FIG. 5 illustrates a mathematically signal summation sequence in which a Raman gain having positive tilt is added to an erbium gain having negative tilt, and further added to a gain flattening filter loss.
Figure 5:
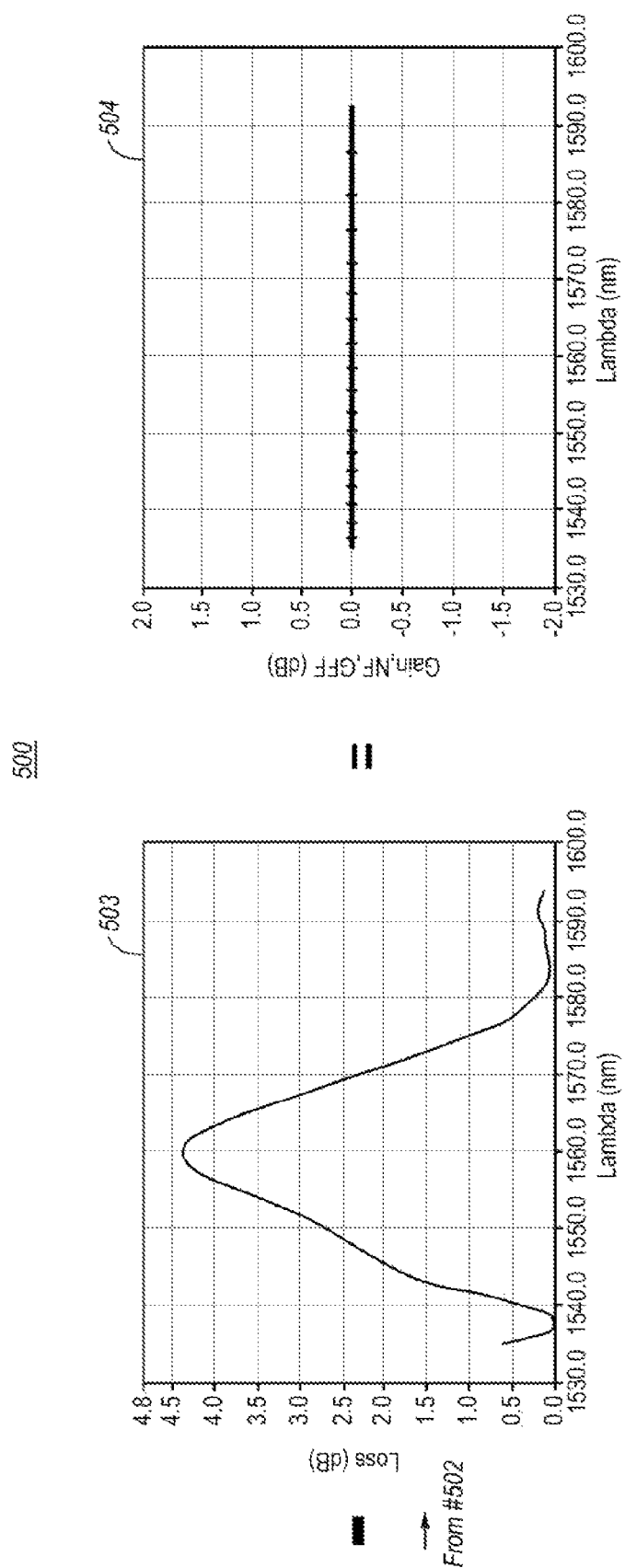

FIG. 5 illustrates a mathematical signal summation sequence 500 in which a Raman gain 501 having positive tilt is added to an erbium gain 502 having negative tilt. Roughly speaking, the positive and negative tilts cancel, leaving little residual tilt. A gain flattening filter loss 503 is then subtracted from the result to form a spectrally flat gain output 504. In this example, the Raman pump has a peak gain that is close to the long wavelength edge of the signal spectrum (1592 nm in plot 501) which results in positive tilt over the signal wavelength range.

Relating plots 500 to FIG. 2, the positive tilt of the Raman gain stage 212 is added to the negative tilt of the rare-Earth doped fiber amplifier 211 to form a signal that has low gain tilt such that a gain flattening filter may reasonably filter out the remaining amount of gain variations to flatten the gain out, and also result in a zero total gain for the combination of the Raman gain stage 212 and the rare-Earth doped fiber amplifier 211.

If the tilt as measured by the tilt sensor 213 is more negative (or less positive) than desired at that point, then the adjustment mechanism 224 may increase the optical pump power 232 to the Raman gain stage 212 and/or decrease the optical pump power 231 to the rare-Earth doped fiber amplifier 211. If the tilt as measured by the tilt sensor 213 is more positive (or less negative) than desired at that point, then the adjustment mechanism 224 may decrease the optical pump power 232 to the Raman gain stage 212 and/or increase the optical pump power 231 to the rare-Earth doped fiber amplifier 211. However, since it is desirable to maintain an average gain of 0 dB, most of the tilt may be controlled by the Raman pump power 232.

Furthermore, since the rare-Earth doped fiber amplifier is operating at least partially in the saturation regime, the impact on the output power of the rare-Earth doped fiber amplifier is less affected by adjustments in the optical pump power of the Raman gain section 212 or the rare-Earth doped fiber amplifier 211. In some embodiments, rare-Earth doped fiber amplifier 211 operates such that the output optical signal power after the rare-Earth doped fiber amplifier 211 is at least ten percent of the optical pump power (corrected for the ratio of pump to signal wavelength) received at the rare-Earth doped fiber amplifier from the doped fiber amplifier optical pump. However, the percentage could also different as mentioned above.

Returning again to FIG. 2, the Raman gain stage 212 is shown as preceding the rare-Earth doped fiber amplifier 211 in the optical signal path. The Raman gain stage 211 may immediately precede the rare-Earth doped fiber amplifier 211 in the optical signal path. For instance the Raman gain stage 211 may be implemented in an optical fiber span that is connected to a repeater that includes the rare-Earth doped fiber amplifier. As an example, FIG. 6 illustrates an environment 600 in which a repeater 610 is connected to an optical fiber span 612 from which the repeater 610 receives an optical fiber signal.

Raman pump 622 uses multiplexer 613 to counter-propagate Raman pump power 632 along the optical signal path to thereby perform counter-propagating Raman amplification. After being Raman amplified and received at the repeater, the optical signal passes through isolator 614 and then is amplified by erbium doped fiber amplifier 611. The doped fiber amplifier pump 621 generates optical pump power 631 that is injected into the signal path using multiplexer 615 to thereby power the erbium doped fiber amplifier 611. A gain flattening filter 616 then operates on the optical signal to flatten out the gain spectrum. The tilt may then be controlled by adjusting the optical pump powers provided to the optical fiber span 612 to perform Raman amplification and/or to the erbium doped fiber amplifier 611 to perform discrete amplification.

In one embodiment, the erbium doped fiber amplifier pump power is shared between two directions of optical signal. In that case, changing the optical pump power of the erbium doped fiber amplifier 611 might also affect tilt and gain in the opposite direction as well. In order to facilitate independent tilt control in that case, perhaps just the Raman pump power 632 of the Raman pump 622 is adjusted, without adjusting the optical pump power 631 supplied by the doped fiber amplifier optical pump 621.

Figure 6:
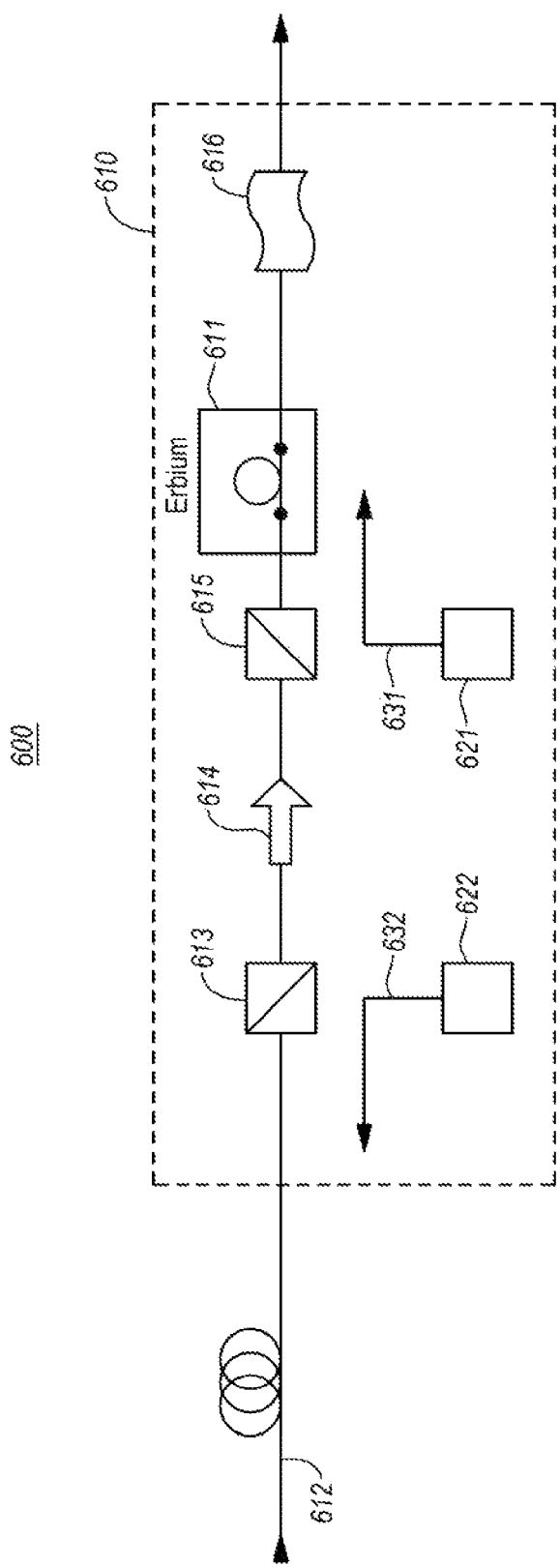
FIG. 6 illustrates an environment in which a repeater is connected to an optical fiber link from which the repeater receives an optical fiber signal.

Comparing FIGS. 2 and 6, the Raman pump 622 represents an example of the Raman pump 222 in that case in which the Raman pump 222 provides counter-propagating Raman amplification within the Raman gain stage. However, the Raman pump 222 could alternatively (or in addition) provide co-propagating Raman amplification within the Raman gain stage 212. In that case, the Raman pump 222 would not be in the same repeater as the rare-Earth doped fiber amplifier 211. For instance, referring to FIG. 1, suppose that the rare-Earth doped fiber amplifier 211 is within the repeater 115(3). In that case, the Raman pump 222 would be within the repeater 115(2) and provide co-propagating Raman pump power into the optical fiber span 114(3).

The ellipses 251 represents that the Raman gain stage 222 (that the tilt control mechanism 224 controls) may be in the optical fiber span that is immediately upstream of the repeater in which the rare-Earth doped amplifier 211 is housed. However, that need not be the case. For instance referring to FIG. 1, the rare-Earth doped amplifier 211 might be housed within the repeater 115(3), whereas the Raman gain stage 212 may be implemented (using co-propagating and/or counter-propagating Raman amplification) in optical fiber span 114(2) or the optical fiber span 114(1).

The arrow 244 and the ellipses 252 together symbolically represent that the tilt adjustment mechanism 224 might control Raman pump power supplied on more than one upstream Raman gain stage. For instance, if the rare-Earth doped fiber amplifier 211 were housed within repeater 115(4), the tilt adjustment mechanism might be implemented by adjusting Raman pump power supplied (in a counter-propagating and/or co-propagating direction) within any or all of the previous optical fiber spans 114(1), 114(2), 114(3) and 114(4).

In one embodiment, the gain within each adjacent combination of a Raman gain stage and adjacent repeater (including an erbium doped fiber amplifier and gain flattening filter) is attempted to be as close to zero as possible, with tilt being flattened after each of these combinations. In that case, the tilt sensor 223 may be just after the gain flattening filter positioned just after the rare-Earth doped fiber amplifier 211 in the optical signal path.

However, the ellipses 253 represents that the tilt sensor 223 need not be positioned just after the rare-Earth doped fiber amplifier 211, and need not even be within the same repeater as the rare-Earth doped fiber amplifier. Nevertheless, the tilt may still be controlled using the tilt adjustment mechanism 224 by adjusting Raman pump power within the Raman gain stage 212 and/or optical pump power supplied to the rare-Earth doped fiber amplifier 211.

Figure 7:
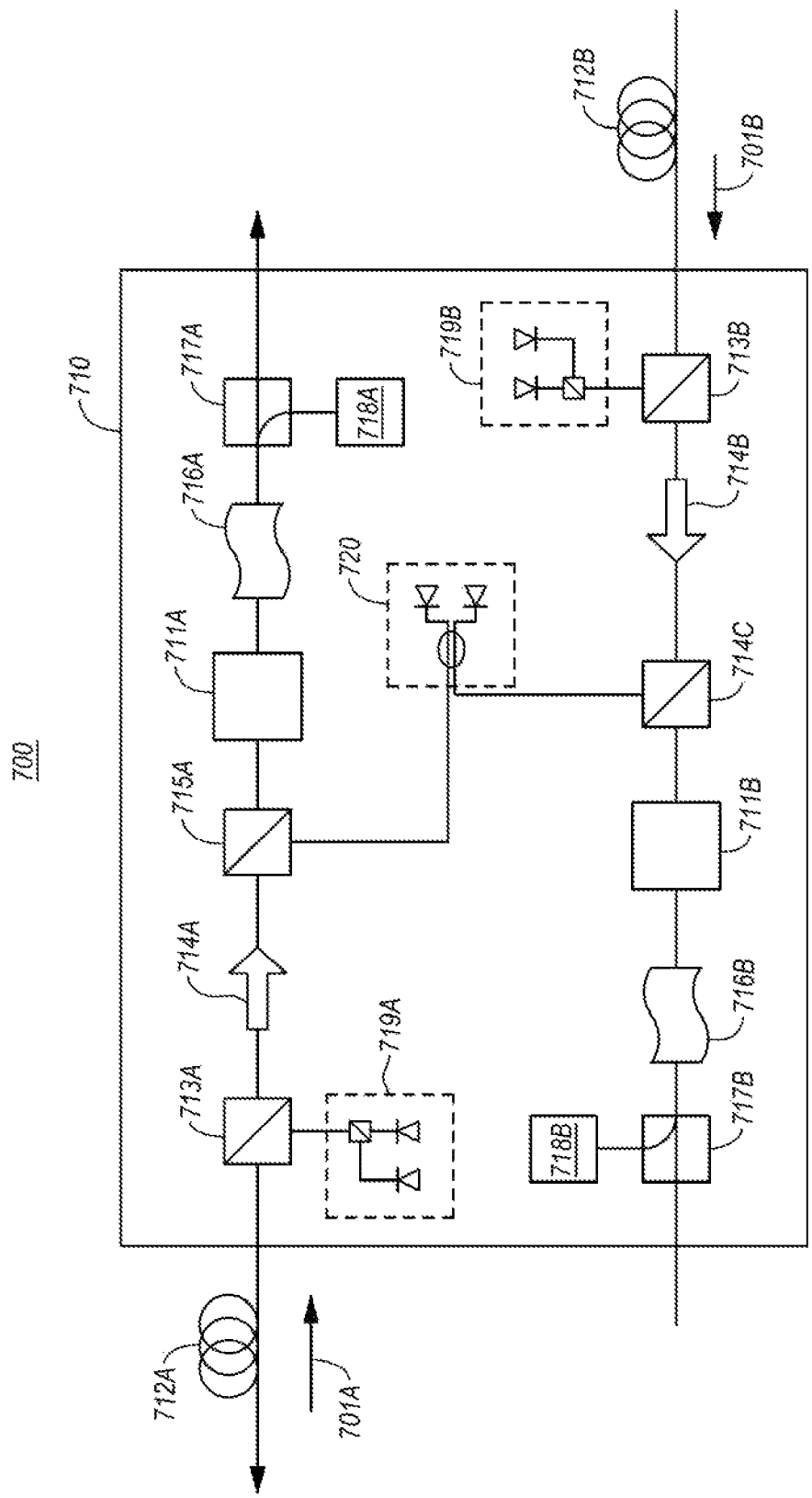
FIG. 7 illustrates a repeater in which amplification is provided to each direction of an optical fiber pair.

FIG. 7 illustrates a repeater and upstream fiber spans 700 in which amplification is provided to each direction of an optical fiber pair. Optical paths associated with only one optical fiber pair are illustrated in FIG. 7. However, a typical repeater will often perform amplification for multiple optical fiber pairs.

For the eastern optical signal 701A, the eastern optical signal travels through the optical fiber span 712A and is received at the repeater 710. A Raman pump 719A provides Raman pump power, which is redirected using multiplexer 713A to counter-propagate against the optical signal 701A in the optical fiber span 712A. Accordingly, the optical signal 701A experiences increasing counter-propagating Raman amplification as the optical signal 701A approaches the repeater 710. The optical signal passes through isolator 714A which isolates the fiber span 712A from light generated in the rare-Earth doped fiber amplifier 711A. The rare-Earth doped fiber amplifier is optically powered using optical pump power from the doped fiber amplifier pump 720. A portion of the pump power from doped fiber amplifier pump 720 is directed to multiplexer 715A to pump amplifier 711A. The gain flattening filter 716A then performs flattening of the gain. A portion of the optical signal power is then drawn using optical tap 717A and directed to tilt sensor 718A.

The western optical signal 701B is provided in a similar way. The western optical signal travels through the optical fiber span 712B and is received at the repeater 710. A Raman pump 719B provides Raman pump power, which is redirected using multiplexer 713B to counter-propagate against the optical signal 701B in the optical fiber span 712B. Accordingly, the optical signal 701B experiences increasing counter-propagating Raman amplification as the optical signal 701B approaches the repeater 710. The optical signal passes through isolator 714B which isolates the fiber span 712B from light generated in the rare-Earth doped fiber amplifier 711B. The rare-Earth doped fiber amplifier is optically powered using optical pump power from the doped fiber amplifier pump 720. A portion of the pump power from doped fiber amplifier pump 720 is directed to multiplexer 715C to pump amplifier 711B. The gain flattening filter 716B then performs flattening of the gain. A portion of the optical signal power is then drawn using optical tap 717B and directed to tilt sensor 718B.

The repeater 710 has complete independent Raman pump control between the eastern optical signal 701A and the western optical signal 701B. However, the optical pump power of the fiber doped amplifier pump 720 is completely shared between the eastern and western optical signals. Accordingly, in this embodiment, it is perhaps better to perform tilt control by only controlling the Raman pump power, and not the doped fiber amplifier pump power, thereby allowing independent pump power control between the eastern and western directions.

In the repeater 710 of FIG. 7, the Raman pumps 719A and 719B might each comprises two 360 mW laser diodes that emit 1495 nm wavelength light. Two are provided such that even if one goes out in each direction, the other may still provide Raman pump power, though a controller within the repeater might cause the remaining laser diode to increase its output power. The doped fiber amplifier pump 720 also includes redundant laser diodes, but they each operate at 980 nanometers and 400 mW in this design.

Complete independence in Raman pump power is not a requirement. For instance, the principles described herein will still be applicable, though with some increased difficulty, if twenty percent of eastern Raman pump power is shared with the western direction. The principles described herein may also be effectively implemented even if there is 50 percent sharing of eastern Raman pump power with the western direction. In this description and in the claims, n % sharing of Raman pump power means that for the eastern direction (100−n) % of the optical pump power provided to the eastern optical signal is provided by optical pump sources that are dedicated to the eastern channel, whereas n % of the optical pump power provided to the eastern optical signal is provided by shared optical pump sources that are shared between the two directions.

Figure 8:
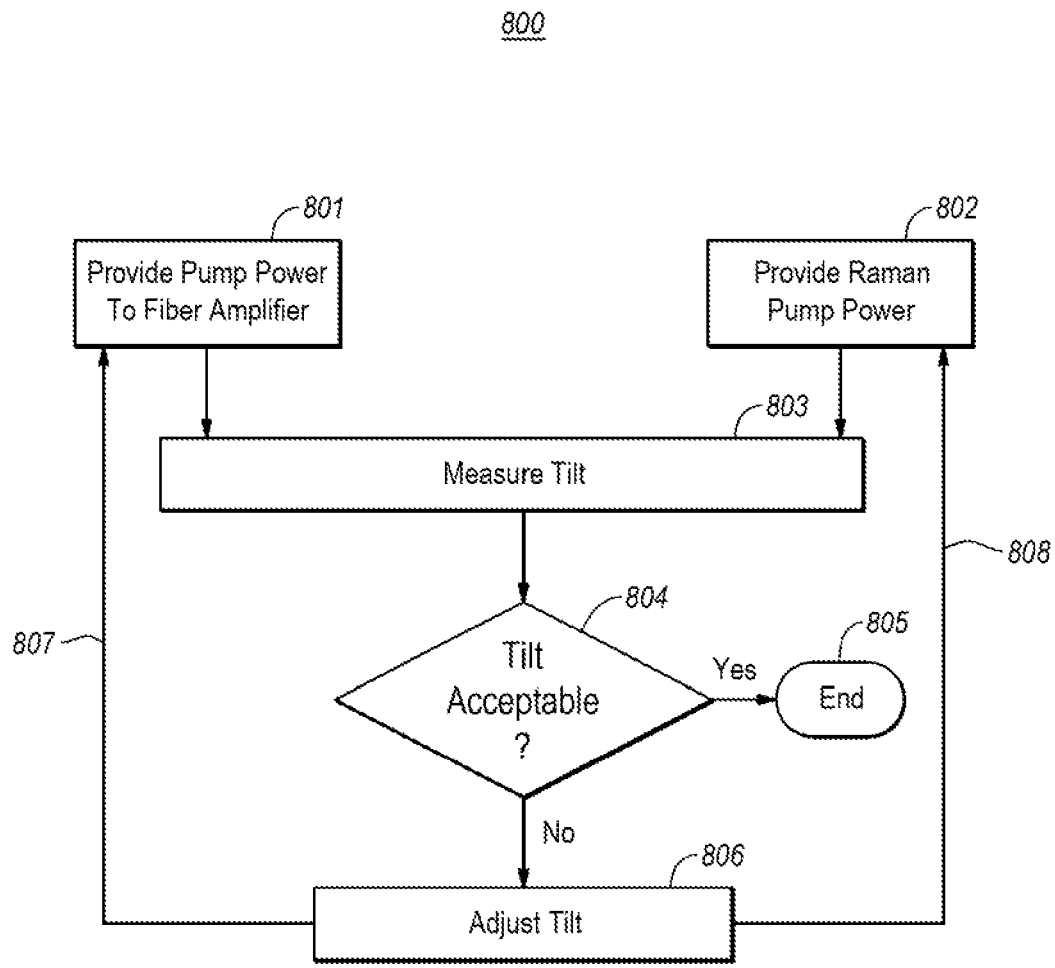
FIG. 8 illustrates a flowchart of a method for performing tilt control of an optical signal in an optical signal path of a repeater.

FIG. 8 illustrates a flowchart of a method 800 for performing tilt control of an optical signal in an optical signal path of a repeater. The method 800 includes an act of a doped fiber amplifier optical pump supplying optical pump power to a rare-Earth doped fiber amplifier (act 801) so that an optical signal power at the output of the rare-Earth doped fiber is at least ten percent of the optical pump power (corrected for the ratio of pump to signal wavelength) received at the rare-Earth doped fiber amplifier from the doped fiber amplifier optical pump. In this state, the rare-Earth doped fiber amplifier contributes positive tilt to optical signals traversing the optical path. The method 800 also includes an act of providing Raman pump power to a Raman gain stage that is upstream of the rare-Earth doped optical fiber amplifier in the optical signal path (802).

The method 800 further includes detecting tilt downstream of the rare-Earth doped fiber amplifier in the optical path (act 803). If the tilt is acceptable ("Yes" in decision block 804), the method ends (act 805). If the tilt is not acceptable ("No" in decision block 804), the tilt is adjusted (act 806). This is performed by adjusting the optical pump power supplied by the doped fiber amplifier optical pump (represented by arrow 807) and/or by controlling the Raman pump power (represented by arrow 808).

Accordingly, the principles described herein provide an effective tilt adjustment mechanism that reduces impact on gain associated with each segment in the optical path. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A repeater comprising:
   a rare-Earth doped fiber amplifier configured to amplify an optical signal while operating at least partially in a gain saturation regime;
   a doped fiber amplifier optical pump configured to supply optical pump power to the rare-Earth doped fiber amplifier;
   a Raman pump configured to provide Raman amplification to the optical signal;
   a tilt sensor configured to detect tilt of the optical signal downstream of the rare-Earth doped fiber amplifier in an optical signal path; and
   a tilt adjustment controller configured to adjust the tilt of the optical signal by controlling at least one of: (i) the optical pump power supplied by the doped fiber amplifier optical pump or (ii) Raman pump power supplied by the Raman pump.

2. The repeater in accordance with claim 1, wherein the rare-Earth doped fiber amplifier comprises an erbium doped fiber amplifier.

3. The repeater in accordance with claim 1, wherein the Raman pump is configured to have a peak Raman gain at a wavelength that is greater than or within 5 nm of a longest signal wavelength of the optical signal and that contributes positive tilt to the optical signal.

4. The repeater in accordance with claim 1, wherein the Raman pump is configured to have a peak Raman gain at a wavelength that is less than or within 5 nm of a shortest signal wavelength of the optical signal and that contributes negative tilt to the optical signal.

5. The repeater in accordance with claim 1, wherein:
   the tilt adjustment controller is configured to adjust the tilt by controlling the Raman pump power; and
   the optical pump power supplied by the doped fiber amplifier optical pump is used to control at least one of: a repeater average optical signal gain or an output average optical signal power.

6. The repeater in accordance with claim 1, wherein the Raman pump is configured to propagate the Raman pump power onto a connected optical fiber span that is downstream of the rare-Earth doped fiber amplifier to thereby perform co-propagating Raman amplification of the optical signal.

7. The repeater in accordance with claim 1, wherein the Raman pump is configured to propagate the Raman pump power onto a connected optical fiber span that is upstream of the rare-Earth doped fiber amplifier to thereby perform counter-propagating Raman amplification of the optical signal.

8. The repeater in accordance with claim 1, wherein the Raman pump is configured to generate the Raman pump power.

9. The repeater in accordance with claim 1, wherein the Raman pump power is generated by an upstream repeater that is upstream of the repeater in the optical signal path.

10. The repeater in accordance with claim 1, wherein:
    the rare-Earth doped fiber amplifier is a first rare-Earth doped fiber amplifier;
    the doped fiber amplifier optical pump is a first doped fiber amplifier optical pump;
    the optical signal is a first optical signal;
    the Raman pump is a first Raman pump; and the repeater further comprises:
a second rare-Earth doped fiber amplifier configured to amplify a second optical signal while operating in the gain saturation regime;
a second doped fiber amplifier optical pump configured to supply optical pump power to the second rare-Earth doped fiber amplifier; and
a second Raman pump configured to provide Raman amplification to the second optical signal.

11. The repeater in accordance with claim 10, wherein:
the first doped fiber amplifier optical pump is configured to supply a fraction of its optical pump power to both the first and second rare-Earth doped fiber amplifiers; and
the second doped fiber amplifier optical pump is configured to supply a fraction of its optical pump power to both the first and second rare-Earth doped fiber amplifiers.

12. A method for performing tilt control of an optical signal in an optical signal path of a repeater, the method comprising:
supplying optical pump power to a rare-Earth doped fiber amplifier using a doped fiber amplifier optical pump, wherein the rare-Earth doped fiber amplifier operates at least partially in a gain saturation regime;
detecting tilt of the optical signal downstream of the rare-Earth doped fiber amplifier in the optical signal path; and
adjusting the tilt of the optical signal by controlling at least one of: (i) the optical pump power supplied by the doped fiber amplifier optical pump or (ii) a Raman pump power supplied by a Raman pump configured to provide Raman amplification to the optical signal.

13. The method in accordance with claim 12, wherein:
adjusting the tilt comprises controlling the Raman pump power; and
the optical pump power supplied by the doped fiber amplifier optical pump is used to control at least one of:
a repeater average optical signal gain or an average output optical signal power.

14. The method in accordance with claim 12, wherein a gain of a combination of (i) a previous optical fiber span in the optical signal path and (ii) the repeater is within 1 dB of zero.

15. The repeater in accordance with claim 1, wherein the Raman pump power substantially comprises a single pump wavelength.

16. The method in accordance with claim 12, wherein the Raman pump power substantially comprises a single pump wavelength.

17. The repeater in accordance with claim 1, wherein:
the Raman pump has a Raman gain with an average tilt of at least 1 dB; and
the tilt adjustment controller is configured to adjust the tilt of the optical signal to within 1 dB of gain or within 1 dB of signal power.

18. The method in accordance with claim 12, wherein adjusting the tilt comprises adjusting the tilt of the optical signal to within 1 dB of gain or within 1 dB of signal power.

19. A repeater comprising:
a rare-Earth doped fiber amplifier configured to amplify an optical signal while operating at least partially in a gain saturation regime;
a doped fiber amplifier optical pump configured to supply substantially constant optical pump power to the rare-Earth doped fiber amplifier for a period of time;
a Raman pump configured to provide Raman amplification to the optical signal;
a tilt sensor configured to detect tilt of the optical signal downstream of the rare-Earth doped fiber amplifier in an optical signal path; and
a tilt adjustment controller configured to adjust the tilt of the optical signal by controlling Raman pump power supplied by the Raman pump without changing an average signal power in an optical transmission link that includes the repeater during the period of time.

20. The repeater according to claim 19, wherein the rare-Earth doped fiber amplifier is configured to operate at least partially in the gain saturation regime when at least one of:
an output optical signal power from the rare-Earth doped fiber amplifier is at least 10% of a corrected optical pump power received at the rare-Earth doped fiber amplifier from the doped fiber amplifier optical pump, the corrected optical pump power denoting an amount of pump power provided to the rare-Earth doped fiber amplifier corrected for quantum conversion efficiency; and
a linear gain of the rare-Earth doped fiber amplifier is reduced by at least 25% compared to a small-signal gain value, the small-signal gain value denoting a maximum amount of gain possible at a particular optical pump power.

* * * * *